(12) United States Patent
Christensen et al.

(10) Patent No.: US 6,530,152 B1
(45) Date of Patent: Mar. 11, 2003

(54) TOOL FOR STRIPPING COAXIAL CABLE

(75) Inventors: Brian Christensen, Kalvehave (DK); Anders Jorgensen, Stensved (DK); Ebbe Petersen, Kalvehave (DK)

(73) Assignee: John Mezzalingua Associates, Inc., East Syracuse, NY (US)

( * ) Notice: Subject to any disclaimer, the term of this patent is extended or adjusted under 35 U.S.C. 154(b) by 100 days.

(21) Appl. No.: 09/693,223

(22) Filed: Oct. 20, 2000

(51) Int. Cl.[7] ................................................. B21F 13/00
(52) U.S. Cl. ......................................................... 30/90.1
(58) Field of Search ................................ 30/90.1, 91.2; 81/9.4, 9.51

(56) References Cited

U.S. PATENT DOCUMENTS

| | | |
|---|---|---|
| 1,567,812 A | 12/1925 | Ober et al. |
| 4,059,893 A | 11/1977 | Solury |
| 4,203,333 A | 5/1980 | Campari |
| 4,317,279 A | 3/1982 | Smith et al. |
| 4,345,375 A | 8/1982 | Hayward |
| 4,379,665 A | 4/1983 | Hendershot et al. |
| 4,559,704 A | 12/1985 | Michael, III |
| 4,594,029 A | 6/1986 | Michael, III |
| 4,706,384 A | 11/1987 | Schreiber et al. |
| 4,729,268 A | 3/1988 | Morrow |
| 4,934,219 A | 6/1990 | Edwards |
| 4,945,636 A | 8/1990 | Takizawa |
| 4,979,299 A | 12/1990 | Bieganski |
| 5,105,542 A | 4/1992 | Nakajima et al. |
| 5,713,132 A * | 2/1998 | Tarpill .................... 30/90.1 X |
| 5,749,270 A | 5/1998 | Bourbeau |

* cited by examiner

Primary Examiner—Douglas D. Watts

(74) Attorney, Agent, or Firm—George R. McGuire; Hancock & Estabrook, LLP

(57) ABSTRACT

The present invention broadly contemplates a co-axial cable stripping tool generally comprising: (a) an elongated main handle having a bored opening formed longitudinally therein; (b) an elongated shaft a portion of which is co-axially positioned within the bored opening and a portion of which extends co-axially away from the main handle; (c) an elongated main housing co-axially aligned with, and longitudinally spaced from the main housing, and securely engaged with a portion of the elongated shaft; and (d) a stripping housing rotatably co-axially positioned within the main housing, and including first and second openings formed through opposing surfaces thereof, wherein the stripping housing is rotatably movable between two positions, each of which exposes one or the other of the first and second openings towards the free end of the tool. The tool further comprises first and second blades engaged with the stripping housing and tangentially extending into the first and second openings, respectively, whereby upon insertion of a co-axial cable into one of the two openings, manual rotation of the main handle about its longitudinal axis effects rotation of the main housing and stripping housing about the longitudinal axis, thereby causing either the first or second blades to rotate about the axis of the cable, severing the protective layer, outer conductor, and/or dielectric therefrom. Further features of the invention include a spring biased, striping housing lock assembly reciprocally mounted in co-axial relation around the main housing, wherein the assembly prohibits rotation of the stripping housing when in its neutral position, and permits rotation of the stripping housing when slid longitudinally rearwardly along the main housing. Additional features include a gauging mechanism scribed into the exterior wall of the main housing for permitting a user to check the length of materials stripped from the cable.

31 Claims, 7 Drawing Sheets

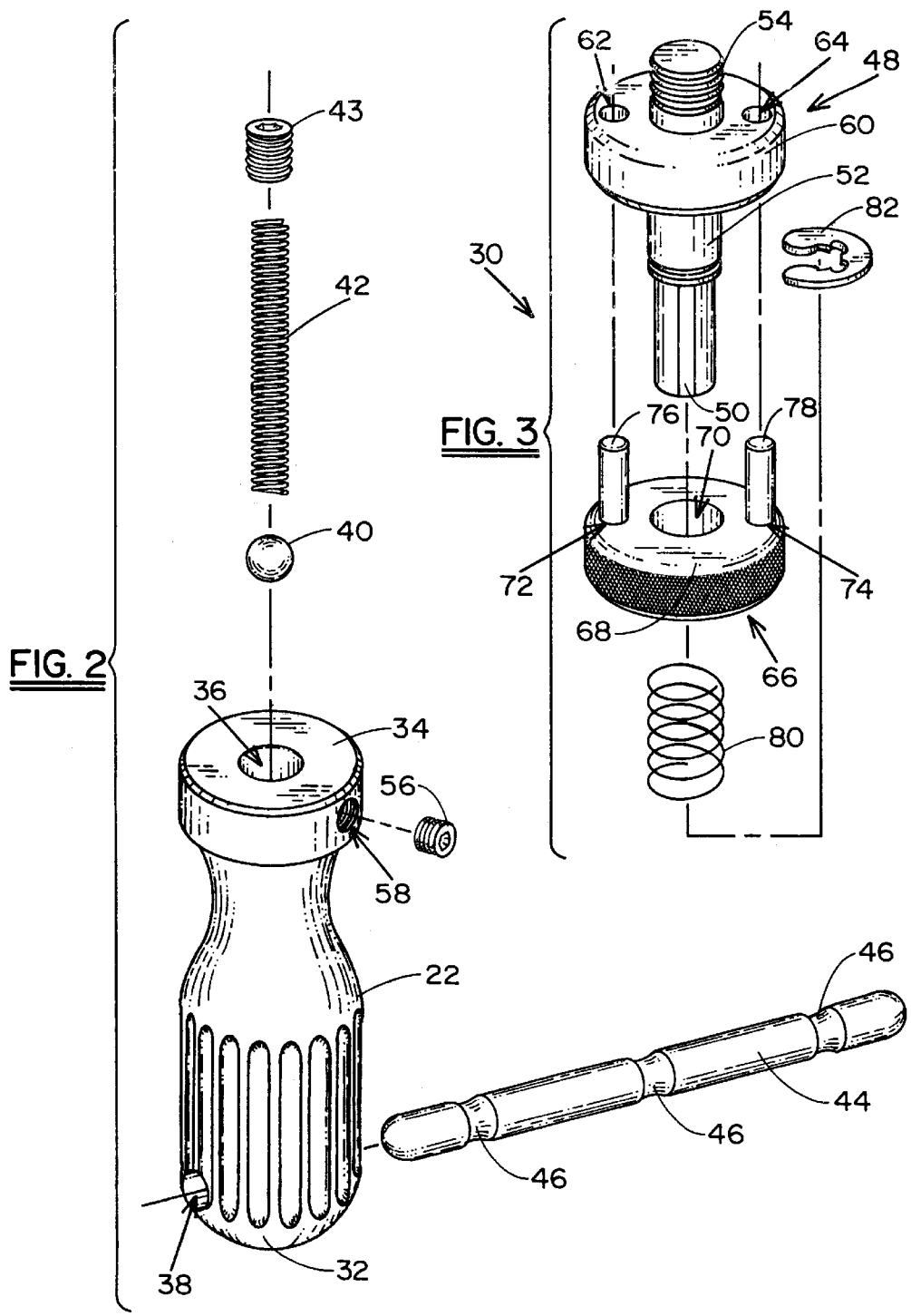

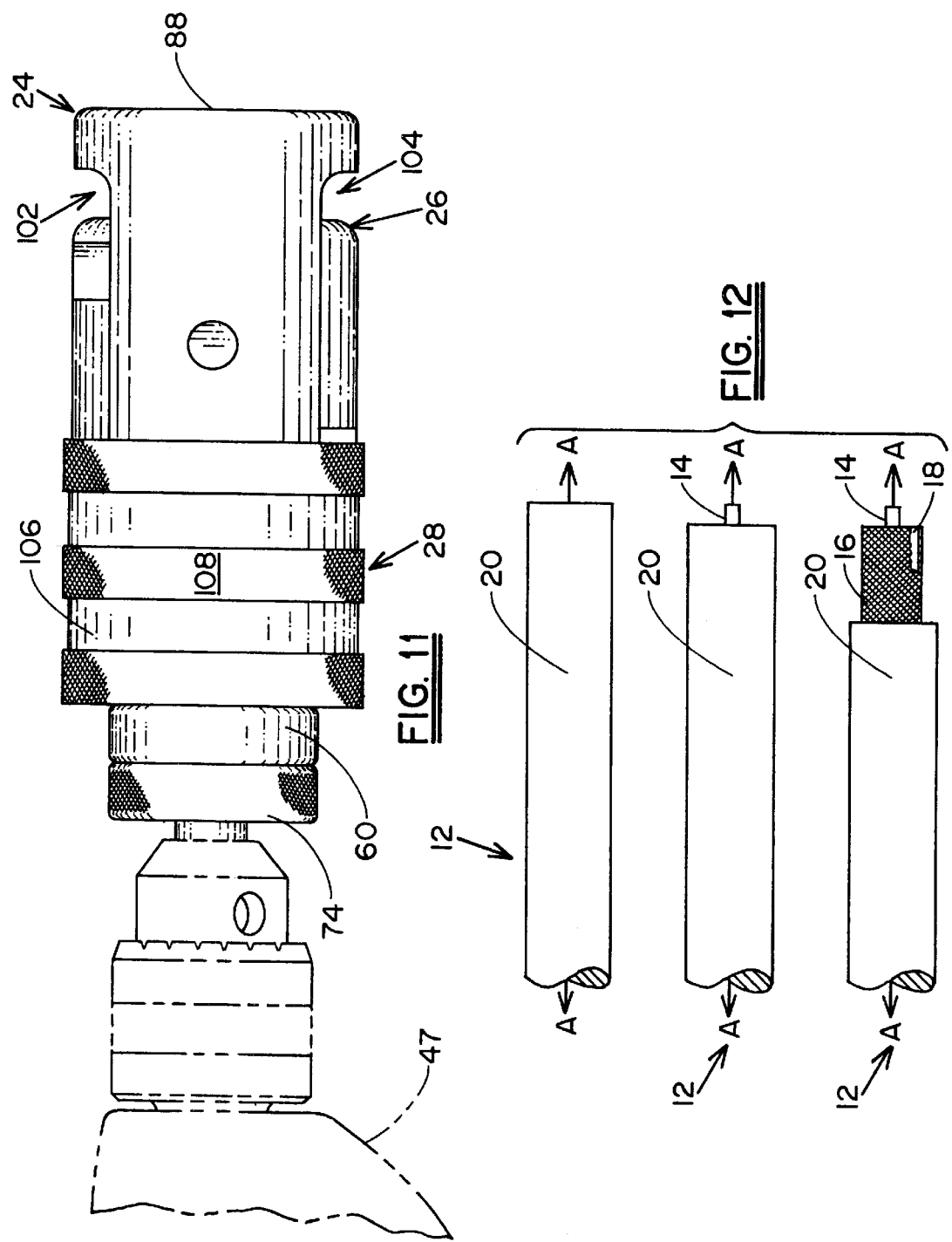

TOOL FOR STRIPPING COAXIAL CABLE

BACKGROUND OF THE INVENTION

1. Field of Invention

The present invention generally relates to apparatus for stripping layers of material from a coaxial cable, and more particularly to tools used to prepare a co-axial cable for termination in order to effectively engage the same with a cable connector.

2. Description of Prior Art

In the CATV industry, cable television signals are traditionally transmitted by coaxial cable. As the cable is extended through a distribution network, several types of electrical devices, such as filters, traps, amplifiers, and the like, are used to enhance the signal and ensure signal integrity throughout the transmission. It is therefore necessary to prepare a coaxial cable for interconnection to these devices in such a manner so as to ensure that the signal is not lost or disrupted.

Preparing the coaxial cable for termination typically involves removing a predetermined length of outer conductor and dielectric material, thereby exposing the central conductor. Immediately rearward of the exposed central conductor, a predetermined length of protective covering must be removed, thereby exposing a strip of the outer conductor over that length. The stripped coaxial cable may then be interconnected to the electrical devices through use of cable connectors.

One common method of terminating a coaxial cable is for a lineman to use a pocketknife to strip the various layers from the cable. The obvious drawbacks of terminating the cable in this manner are the inaccuracy of the strip lengths and the inadvertent severing of material (inaccurate depths of cut). Moreover, this method is manually intensive and time consuming.

Other types of tools have been developed to improve upon the accuracy and speed with which cables can be terminated. Examples of these tools can be readily seen in U.S. Pat. No. 5,749,270 to Bourbeau; U.S. Pat. No. 4,729,268 to Morrow; U.S. Pat. No. 1,567,812 to Ober et al.; U.S. Pat. No. 4,059,893 to Solury; U.S. Pat. No. 4,203,333 to Campari; U.S. Pat. No. 4,317,279 to Smith et al.; U.S. Pat. No. 4,559,704 to Michael, III; 4,379,665 to Hendershot et al.; U.S. Pat. No. 4,345,375 to Hayward; and U.S. Pat. No. 4,934,219 to Edwards. While each of these tools may serve their intended functions, there remains a need for a tool that may be easily and effectively used by lineman to prepare a coaxial cable for termination.

It is therefore a principal object and advantage of the present invention to provide a coaxial cable stripping tool that effectively prepares a coaxial cable for termination.

It is an additional object and advantage of the present invention to provide a coaxial cable stripping tool that may be easily maintained and is versatile in its use.

It is a further object and advantage of the present invention to provide a coaxial cable stripping tool that effectively gauges the length of material being stripped from the cable.

Other objects and advantages of the present invention will in part be obvious, and in part appear hereinafter.

SUMMARY OF THE INVENTION

In accordance with the forgoing objects and advantages, the present invention provides a tool for stripping two predetermined lengths of material at two predetermined radial depths of cut from a coaxial cable. The tool generally comprises an elongated main handle extending along a longitudinal axis and having a bored opening formed longitudinally therein; an elongated shaft a portion of which is co-axially positioned within the bored opening and a portion of which extends co-axially away from the main handle; an elongated main housing co-axially aligned with and longitudinally spaced from the main handle, and securely engaged with a portion of the elongated shaft; and a stripping housing rotatably and co-axially positioned within the main housing, and including first and second surfaces in which first and second openings are respectively formed. In a preferred embodiment, the stripping housing is rotatably movable between first and second positions, each of which positions the first and second openings in coaxial alignment with the tool's longitudinal axis. Blades are securely engaged within the first and second openings with their cutting edges tangentially extending into a respective one of the openings. In particular, the two blades are fixed in their respective openings such that when a coaxial cable is axially introduced into the opening and the tool is rotated about its longitudinal axis, the cutting edge will remove a layer or layers of material from the cable at predetermined radial depths of cut and at predetermined lengths relative to the cable. Alternatively, the stripping housing may include more than two openings formed therein, wherein each opening receives a cutting blade therein, thus providing a tool capable of forming more than two radial depths of cut.

BRIEF DESCRIPTION OF THE DRAWING

The present invention will be further described and more fully understood by reading the following Detailed Description in conjunction with the accompanying drawings, in which:

FIG. 2 is an exploded perspective view of the handle assembly of the present invention;

FIG. 3 is an exploded perspective of the rotational motion transfer assembly of the present invention;

FIG. 11 is a partial side elevational view of an alternate embodiment of the present invention and FIG. 12 is a sequential view of a coaxial cable as it is terminated in accordance with the present invention.

DETAILED DESCRIPTION

Figure 1:
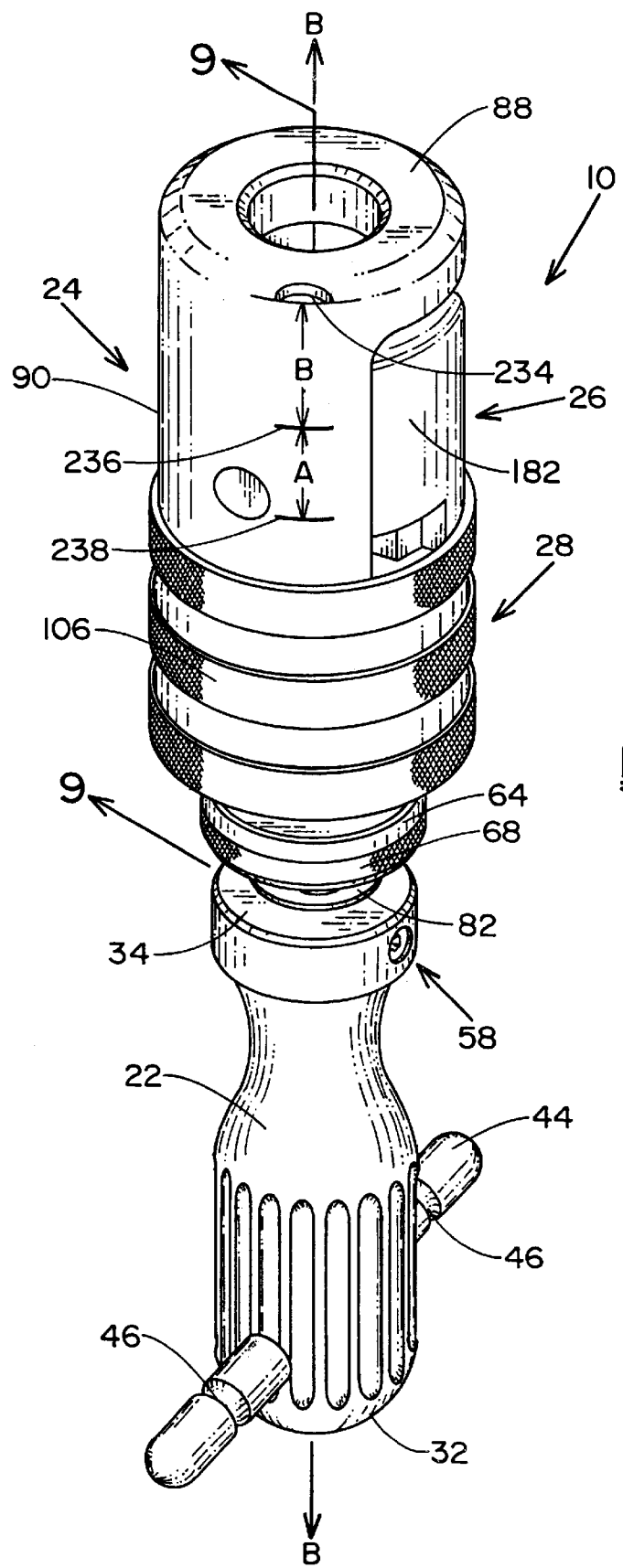
FIG. 1 is a perspective view of the present invention.

Referring now to the drawing figures, wherein like reference numerals refer to like parts throughout, there is seen in FIG. 1 a tool, designated generally by reference numeral 10, for terminating a co-axial cable 12 so as to permit engagement thereof to a standard cable connector. For background purposes and with reference to FIG. 12, co-axial cable 12 extends along a longitudinal axis A—A and includes an inner, central conductor 14 (typically composed of copper), a foil and braided, outer conductor 16 (typically aluminum), a dielectric material 18 (typically a polyethylene or polystyrene foam) disposed between and bonded to each of central conductor 14 and outer conductor 16, and a protective layer 20 covering the outer surface of outer conductor 16. Tool 10 is intended to be used to strip a first predetermined length of protective layer 20, outer conductor 16 and dielectric 18, thereby exposing a length of the central conductor 14, and strip a second predetermined length of protective layer 20 from outer conductor 16 immediately rearward from the exposed central conductors 14, in order to terminate co-axial cable 12 for proper connection to a cable connector.

Tool 10 extends along a longitudinal axis B—B and generally comprises a main handle 22, a main housing 24 positioned in longitudinally spaced, co-axially aligned relation to handle 22, a cable stripping housing 26 rotatably positioned within and in co-axial alignment with main housing 24, a stripping housing lock assembly 28 reciprocally positioned on and in co-axial alignment with main housing 24, and a rotational motion transfer assembly 30 interconnecting main handle 22 to main housing 24. As will be explained in greater detail hereinafter, rotational motion about longitudinal axis B—B that is manually or automatically imparted to main handle 22 will ultimately be transferred to stripping housing 26 through motion transfer assembly 30 and main housing 24, thereby effecting removal of protective material 20, outer conductor 16, and dielectric 18 from co-axial cable 12.

Referring to FIG. 2, handle 22 comprises an elongated, conventional screwdriver-type handle having a proximal end 32, a distal end 34, a bored hole 36 extending co-axially inwardly from distal end 34, and a hole 38 formed transversely therethrough and positioned adjacent proximal end 32 and in intersecting relation to the end of bored hole 36. A ball 40, such as a stainless steel ball bearing, is positioned at the intersection of holes 36 and 38 (ball 40 has a diameter that is greater than the diameter of hole 38 to prevent it from slipping out therefrom), and a coil spring 42 is longitudinally positioned within bored hole 36, thereby biasing ball 40 to protrude slightly into hole 38. A screw 43 is engaged with a threaded portion of bored hold 38 in order to compress spring 42, thereby causing spring 42 to maintain a bias force against ball 40.

In order to facilitate easier manual rotation of handle 22, an elongated rod 44 extends through hole 38. Rod 44 is of a predetermined length, substantially longer than the width of handle 22, and includes a series of longitudinally spaced apart grooves 46 formed circumferentially therearound, at least one of which is at about the middle of the rod's length. Through the biasing force created by spring 42, ball 40 snap engages a groove 46 as rod 44 is passed through hole 38, thereby forcibly retaining rod 44 in fixed position relative to handle 22. Depending on how the user of tool 10 desires to orient rod 44 within handle 22, any one of the numerous grooves 46 can be selected to become engaged by ball 40 by forcibly moving rod 44 through hole 38.

Alternatively, a drill 47 (see FIG. 11) can be used in place of handle 22 in order to automatically impart rotational motion to tool 10.

Referring to FIG. 3, rotational motion transfer assembly 28 interconnects handle 22 to main housing 24 and comprises an adapter body 48 having a first shaft portion 50 that is noncircular, and preferably hexagonal, in cross-section and is positioned primarily within bored hole 38, and a second shaft portion 52 extending co-axially with first shaft portion 50 and terminating in a threaded portion 54. A set screw 56 passes through a hole 58 formed transversely through handle 22 adjacent its distal end 34 in order to securely retain first shaft portion 50 in fixed position relative to handle 22 (see FIG. 2). A disc 60 is securely (may be integrally) engaged with a second shaft portion 52 at an intermediate position therealong. Disc 60 includes a pair of diametrically opposed holes 62, 64 formed therethrough.

Rotational motion transfer assembly 28 further comprises a locking mechanism 66 which interlocks to main housing 24, as will be explained in greater detail hereinafter. Locking mechanism 66 comprises a disc 68 having an opening 70 formed centrally therethrough, a pair of diametrically opposed openings 72, 74 formed therethrough, and a pair of pins 76, 78 which extend through and are securely engaged with openings 72, 74, respectively. Disc 68 is mounted for longitudinal reciprocal motion along shafts 50, 52 which freely pass through opening 70, and is oriented such that openings 72, 74 are axially aligned with holes 62, 64. To provide the reciprocating motion to disc 68, a spring 80 is positioned around shaft 50 and compressed between the distal end 34 of handle 22 and disc 68. A washer 82 is further provided adjacent distal end 34 to provide stability to spring 80. Due to the constant compression of spring 80, disc 68 is forcibly biased against disc 60 with pins 76, 78 passing through holes 62, 64.

Figure 4:
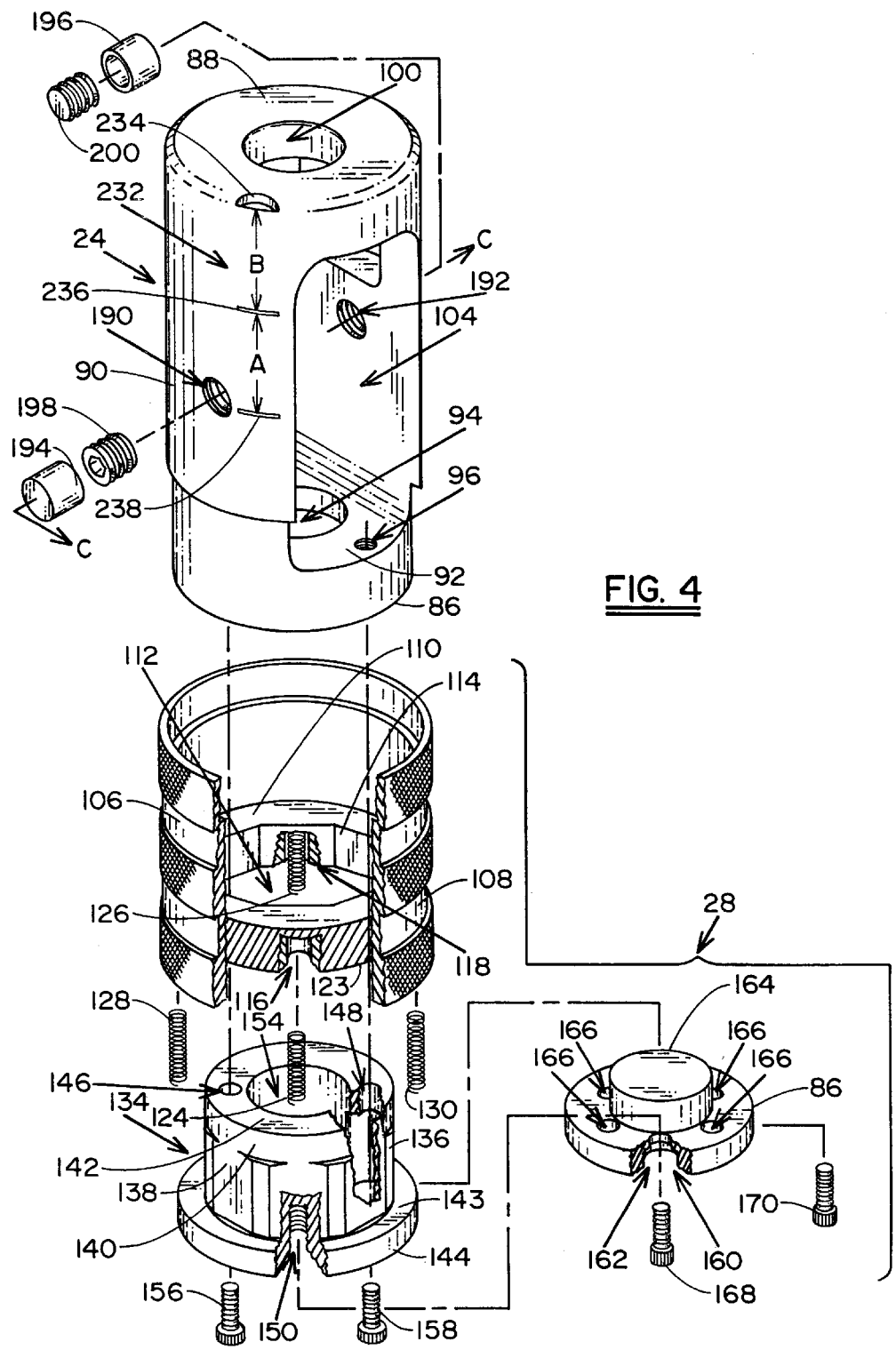
FIG. 4 is an exploded perspective of the main housing and stripping housing locking assemblies of the present invention.
Figure 9:
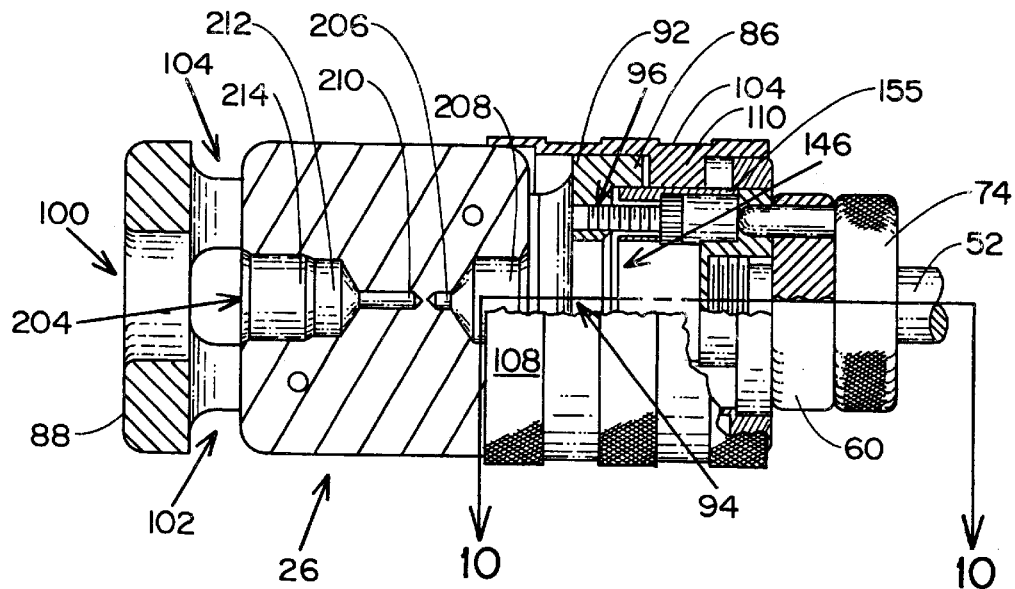
FIG. 9 is a partial cut away, partial cross sectional view taken along line 9—9 of FIG. 1.
Figure 10:
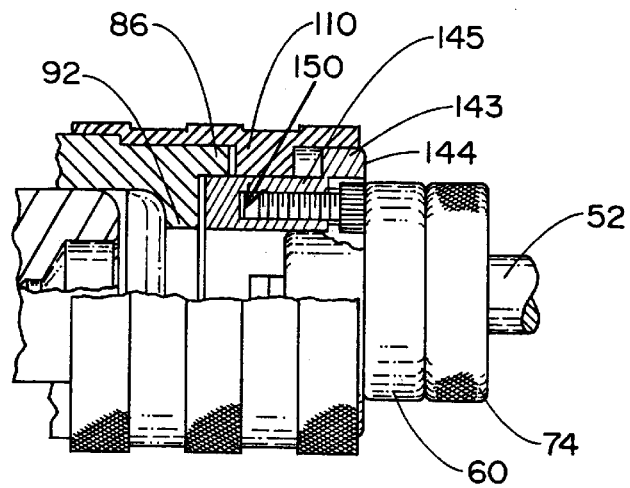
FIG. 10 is a cross sectional view taken along line 10—10 of FIG. 9.

Referring most specifically to FIGS. 4, 9 and 10, after passing through holes 62, 64, pins 76, 78 engage holes that are formed through a plate 86 which is securely attached to main housing 24, as will be described in greater detail hereinafter, thereby completing the interconnection between handle 20 and main housing 24. In order to understand the connection of plate 86 to main housing 24, the internal structure of main housing 22 must first be understood. Main housing 24 includes a proximal end 86, a distal end 88, and an outer body 90 extending between the proximal and distal ends. A flange 92 (see FIG. 9) is formed interiorly of body 90, adjacent proximal end 86, and extends in a plane that is transverse to longitudinal axis B—B. Flange 92 includes a central opening 94 and two diametrically opposed, tapped holes 96 (only one of which is seen in FIG. 4). Main housing 24 further includes a central opening 100 formed through distal end 88 which is adapted to receive co-axial cable 12 therethrough, and two diametrically opposed, elongated openings 102, 104 formed through body 90.

Stripping housing lock assembly 28 essentially comprises stripping housing lock 106 that is mounted to main housing 24 for reciprocating movement along longitudinal axis B—B. Lock 106 includes a cylindrical body 108 and a flange 110 formed in the interior thereof. Flange 110 includes a central opening 112 defined by hexagonal walls 114, and four, circumferentially spaced cells 116, 118 (only two shown in FIG. 4) formed in its proximal wall 123 which receive springs 124, 126, 128, and 130, respectively, therein. Lock 106 is positioned in overlying relation to main housing 24 with flange 110 positioned in contacting relation to proximal end 86 when in its locked (neutral) position.

Stripping housing lock assembly 28 further comprises an adapter 134 that maintains lock 106 in a reciprocally movable position relative to main housing 24. Adapter 134 includes a body 136 defined by hexagonal walls 138 which correspond in size with the hexagonal walls 114 defining opening 112, and an annular wall 140 which terminates in distal end 142. A flange 143 extends outwardly from the proximal end of hexagonal walls 138 to form the proximal end 144 of adapter 134. A shoulder 145 is defined on body 136 by flange 142, and includes a pair of diametrically opposed counter-sunk holes 146, 148 formed therethrough, and a pair of tapped holes 150, 152 formed therein. A central opening 154 extends through adapter 134.

Adapter 134 engages lock 106 with hexagonal walls 138 aligned with corresponding ones of hexagonal walls 114, and annular wall 140 extending into main housing 24 with its distal end 142 contacting flange 92 with counter-sunk holes 146, 148 being axially aligned with tapped holes 96, 98, respectively. A pair of screws 156, 158 pass through holes 146, 96 and 148, 98, respectively, in order to securely fasten adapter 134 to main housing 24. In addition, springs 124, 126, 128, and 130 are compressed between the inner surface of flange 142 and their respective cells 116, 118, thereby permitting lock 106 to be reciprocally moved along longitudinal axis B—B relative to main housing 24. The bias produced by springs 124, 126, 128, and 130 cause lock 106 to be in a locked position (e.g., the position that prevents rotation of stripping housing 26 due to the blockage created by lock 106) when in a neutral state, thus requiring user applied force to move lock 106 to its unlocked position (e.g., the position that permits rotation of stripping housing 26). With adapter 134 securely connected to main housing 24, proximal walls 144 and 124 lie in a common plane that is transverse to longitudinal axis B—B.

Returning now to plate 86, it includes a central tapped hole 160 formed centrally therethrough, a pair of diametrically opposed countersunk openings 162 (only one shown in FIG. 4) formed therein, and a plurality of circumferentially spaced apart openings 166 formed therethrough. A bushing 165 is attached in co-axial relation to the distal surface 166 of plate 86, and is correspondingly sized to be received within opening 154. Bushing 165 is positioned within opening 154 with countersunk openings 162, 164 axially aligned with tapped openings 150, 152, respectively. A pair of screws 168, 170 pass through openings 162, 150 and 164, 152, respectively, thereby securely interconnecting plate 86 to main housing 24 (through its secure connection to adapter 134 which, in turn, is securely attached to main housing 24 as described hereinbefore).

Handle 22 is interconnected to plate 86 by screwing threaded portion 54 of shaft 52 into tapped opening 160. When threaded portion 54 is fully engaged with tapped opening 160, the ends of pins 76, 78 securely engage a pair of diametrically opposed openings 166. Due to the spring bias of locking mechanism 66, the engagement of pins 76, 78 in openings 166 effectively transfers any rotational motion imparted to handle 22 to main housing 24. The ease with which handle 22 may be attached to plate 86 permitting a user to attach main housings and stripping housing adapted to receive various sized coaxial cables to handle 22, thereby enhancing the versatility of tool 10.

Figure 5:
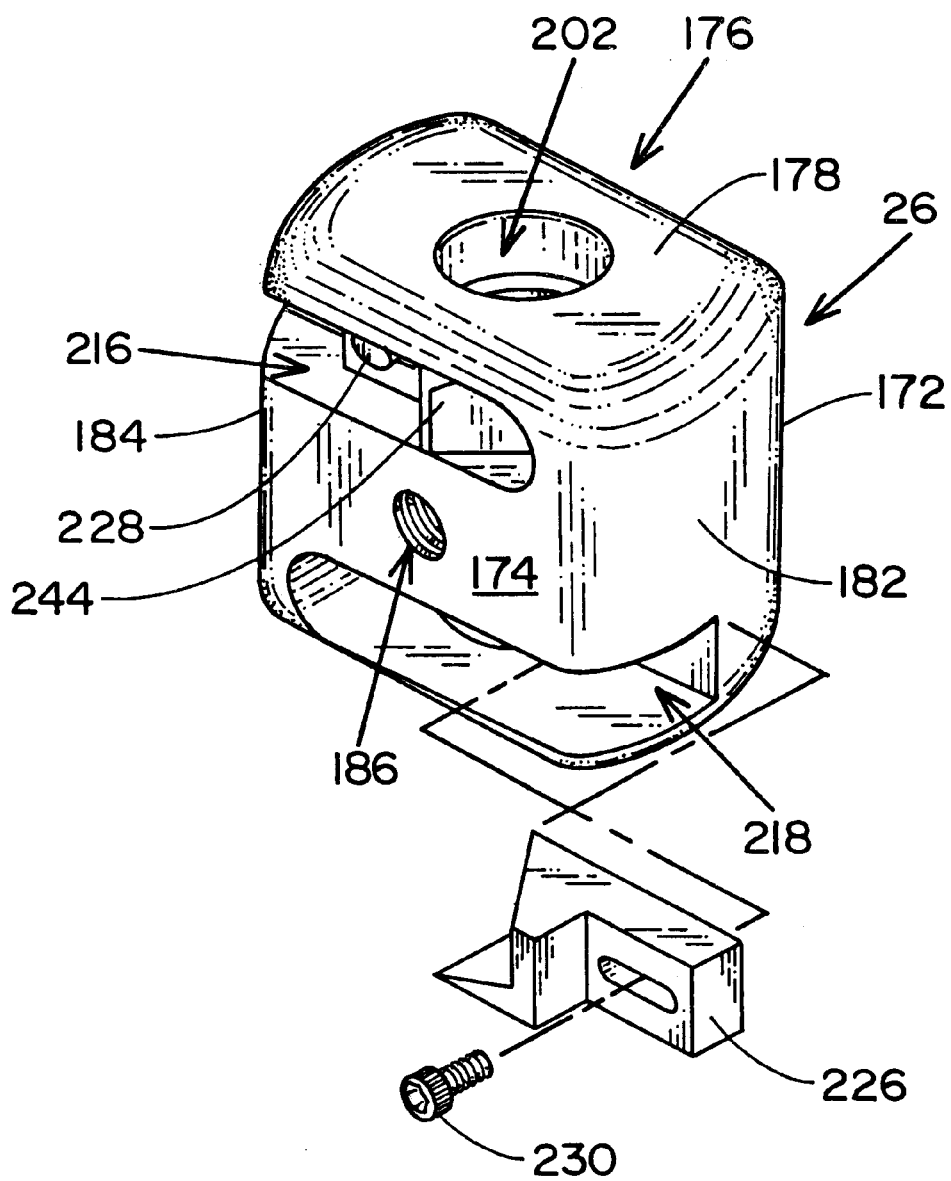
FIG. 5 is an exploded perspective of the cable stripping housing assembly.

In order to terminate co-axial cable 12, the rotational motion transferred to main housing 24 must be further transferred to stripping housing 26. With reference to FIG. 5, stripping housing 26 comprises an essentially recti-linear body 172 having opposed major surfaces 174, 176 which are bridged by opposing end walls 178, 180, and opposing sidewalls 182, 184. A tapped opening 186 (only one shown in FIG. 5) is formed through each major surface 174, 176, respectively, at about the geometric centers thereof. To interconnect stripping housing 26 to main housing 24, stripping housing 26 is inserted sidewall first through elongated openings 102, 104 until tapped openings 186 are axially aligned with diametrically opposed openings 190, 192, respectively, which are formed through body 90. A pair of plastic plugs 194, 196 may be used to line openings 190, 192, respectively, and a pair of screws 198, 200 are passed through openings 186, 190 and 188, 192, respectively, to interconnect stripping housing 26 to main housing 24. Stripping housing 26 is capable of rotation within main housing 24 about an axis C—C which extends through screws 198, 200, for reasons that will be explained hereinafter.

With reference to FIG. 9, stripping housing 26 includes predetermined sized and shaped bored openings 202, 204 formed in end walls 178, 180, respectively. Openings 202, 204 are adapted to receive the end of co-axial cable 12 therein. Opening 202 terminates in a first region 206 that includes a diameter about equal to the diameter of central conductor 14 and is of a first predetermined length. From first region 206, opening 202 tapers outwardly to a second region 208 that is of a second diameter that is about equal to the diameter of co-axial cable 12 and is of a second predetermined length A equal to the length of the strip of co-axial cable 12 from which the dielectric 18, outer conductor 16 and insulator 20 are to be removed.

Opening 204 terminates in a first region 210 that is of the same diameter as first region 206, and is of a third predetermined length that is equal to the predetermined lengths of regions 206 and 208 combined. Opening 204 then tapers outwardly to a second region 212 which is of a fourth predetermined length B equal to the length of outer conductor 16 desired to be left exposed, and of a diameter about equal to that of outer conductor 16. Opening 204 then tapers outwardly to a third region 214 that is of a predetermined length and of a diameter about equal to the diameter of co-axial cable 12.

A pair of elongated notches 216, 218 are formed at diagonally opposed positions in major surface 174, and include respective tapped openings formed in the floors thereof. Blades 224, 226 are attached to major surface 174 within notches 216, 218 via screws 228, 230, respectively. Blades 224, 226 include cutting edges that tangentially extend into regions 208 and 214, respectively.

It should be understood that stripping housing 26 could be made with openings 202, 204 formed in adjacent surfaces thereof, as opposed to opposing surfaces. In addition, it should further be understood that openings, such as openings 202, 204, could be formed in more than two surfaces of stripping housing 26, thereby permitting tool 10 to be used to cut coaxial cables at more than two radial depths of cut.

Once cable 12 has been properly stripped using tool 10, the lengths of strips of material removed therefrom can be checked for accuracy against gauging mechanism 232. Gauging mechanism 232 comprises a notch 234 removed from distal end 88 and first and second lines 236, 238, respectively, scribed into outer body 90 along axes that are transverse to longitudinal axis B—B. The distance between line 236 and 238 is length A, and the distance from notch 234 to line 236 is length B. Accordingly, cable 12 can be positioned adjacent gauging mechanism 232 with the beginning of the untreated portion of cable 12 adjacent notch 234 and the stripped portions of cable 12 extending towards lines 236 and 238. If cable 12 has been properly stripped, central conductor 14 will be exposed from line 236 to line 238, and outer conductor 16 will be exposed between line 236 and notch 234.

Figure 6:
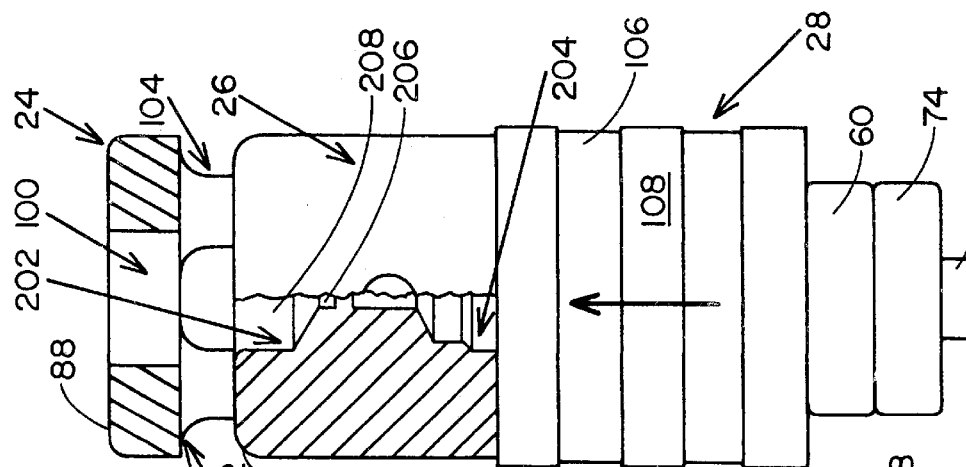
FIGS. 6–8 are sequential, partial cross sectional views illustrating the rotation of the cable stripping housing assembly within the main housing assembly.
Figure 7:
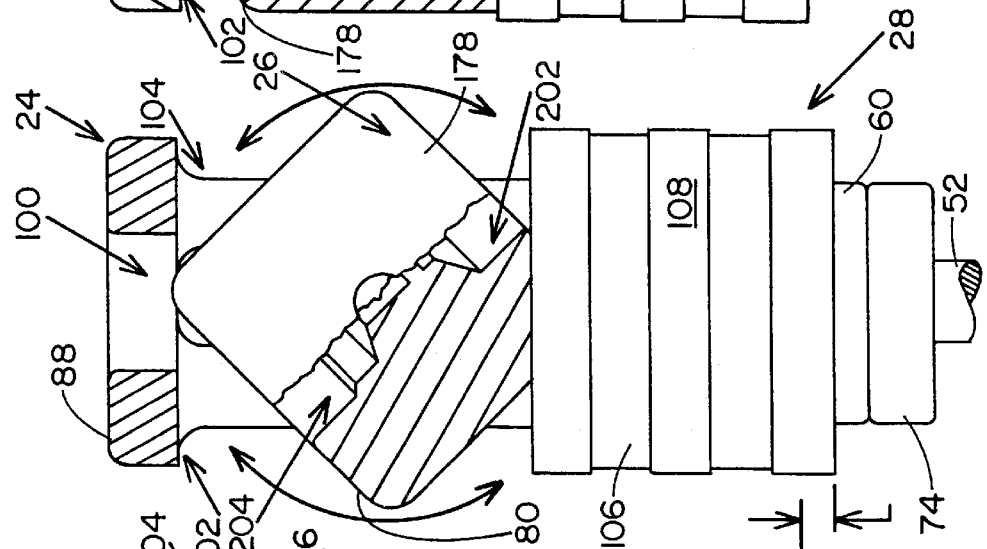
Figure 8:
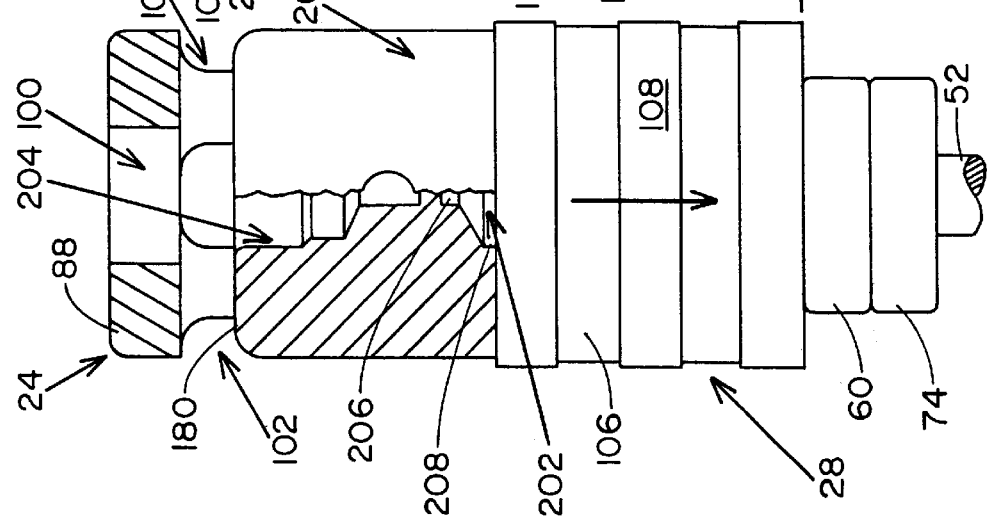

As illustrated in FIGS. 6–8, in use, a user of tool 10 would first position stripping housing 26 such that opening 202 is adjacent to and co-axially aligned with opening 100. The untreated coaxial cable 12 is then inserted endwise into opening 202 with the tip of central conductor 12 positioned within first region 206. The user would then rotate tool 10 at least 180 degrees about its longitudinal axis B—B either manually via handle 22, or automatically via drill 47, thereby causing blade 224 to rotate about the longitudinal axis A—A of cable 12 (which is coaxial with axis B—B when cable 12 is positioned within tool 10) and sever and strip the dielectric 18, outer conductor 16 and insulator 20 from cable 12 over length A. The user would then remove cable 12 from tool 10 and proceed to slide lock 106 rearwardly along axis B—B as indicated by the downwardly directed arrow in FIG. 6. With lock 106 in its unlocked position, the user would then rotate stripping housing body 172 about axis C—C for 180 degrees, thereby positioning opening 204 adjacent to and in co-axial alignment with opening 100 (see FIG. 7).

The user would then release lock 106, thereby permitting it to return to its locked position as indicated by the upwardly directed arrow in FIG. 8. The partially stripped end of cable 12 would then be inserted into opening 204. The user would then once again rotate tool 10 at least 180 degrees about its longitudinal axis B—B, thereby causing blade 226 to rotate about axis A—A of cable 10 and sever and strip the insulating layer 20 from cable 12, thereby exposing outer conductor 16. The cable may then be removed from tool 10 and the lengths of strips removed therefrom can be checked against gauging mechanism 232 as described hereinabove.

What is claimed is:

1. A tool for terminating a co-axial cable extending along a first longitudinal axis, and having an inner conductor, an outer conductor, a dielectric material disposed between the inner and outer conductors, and a protective material disposed in covering relation to the outer conductor, said tool comprising:
   a. a handle;
   b. a main housing interconnected to said handle;
   c. a stripping housing engaged with said main housing for movement relative thereto between first and second cutting positions; and
   d. a stripping housing lock assembly comprising a lock member positioned in overlying relation to said main housing and being reciprocally movable therealong between locked and unlocked positions relative to said stripping housing.

2. The tool according to claim 1, wherein said stripping housing includes first and second surfaces in which first and second openings are formed, respectively.

3. The tool according to claim 2, further comprising first and second blades engaged with said stripping housing and tangentially extending into said first and second openings, respectively.

4. The tool according to claim 1, further comprising spring members compressingly engaged with said lock member.

5. The tool according to claim 1, wherein said main housing comprises proximal and distal ends, and a body extending therebetween, said distal end having an opening formed therethrough of sufficient diameter to permit the coaxial cable to coaxially extend therethrough.

6. The tool according to claim 1, further comprising a rotational motion transfer assembly.

7. The tool according to claim 6, wherein said rotational motion transfer assembly comprises:
   a. an elongated shaft interconnecting said main handle to said main housing, and
   b. a locking mechanism for transferring rotational motion from said main handle to said main housing.

8. The tool according to claim 7, wherein said locking mechanism comprises a disc positioned on said elongated shaft, and first and second pins securely engaged with said disc and removably engaged with said main housing.

9. The tool according to claim 1, wherein said stripping housing comprises first and second opposing major surfaces, first and second opposing sidewalls, and first and second surfaces in which first and second openings are formed, respectively.

10. The tool according to claim 9, further comprising first and second tapped openings formed in said first and second major surfaces, respectively.

11. The tool according to claim 10, wherein said stripping housing is rotatably interconnected to said main housing by first and second screws extending through said main housing and into said first and second tapped openings, respectively, and said stripping housing is rotatable about a second longitudinal axis that extends through said first and second screws.

12. The tool according to claim 11, wherein said main housing extends a third longitudinal axis that is transverse to said second longitudinal axis.

13. The tool according to claim 1, further comprising a gauging mechanism incorporated into said main housing.

14. The tool according to claim 13, wherein said gauging mechanism comprises a notch formed in said main housing, a first line scribed into said main housing and longitudinally spaced from said notch, and a second line scribed into said main housing and longitudinally spaced from said notch and said first line.

15. A tool adapted for terminating a coaxial cable extending along a first longitudinal axis, and having an inner conductor, an outer conductor, a dielectric disposed between the inner and outer conductors, and a protective material disposed in covering relation to the outer conductor, said tool comprising:
   a. a main housing;
   b. a stripping housing engaged with said main housing for movement relative thereto between first and second cutting positions; and
   c. a gauging mechanism comprising a notch formed in said main housing, a first line scribed into said main housing and longitudinally spaced from said notch, and a second line scribed into said main housing and longitudinally spaced from said notch and said first line.

16. The tool according to claim 15, wherein said stripping housing includes first and second surfaces in which first and second openings are formed, respectively.

17. The tool according to claim 16, further comprising first and second blades engaged with said stripping housing and tangentially extending into said first and second openings, respectively.

18. The tool according to claim 16, further comprising a stripping housing lock assembly.

19. The tool according to claim 18, wherein said stripping housing lock assembly comprises a lock member positioned in overlying relation to said main housing and being reciprocally movable therealong between locked and unlocked positions.

20. The tool according to claim 19, further comprising spring members compressingly engaged with said lock member.

21. The tool according to claim 15, wherein said main housing comprises proximal and distal ends, and a body extending therebetween, said distal end having an opening formed therethrough of sufficient diameter to permit the coaxial cable to coaxially extend therethrough.

22. The tool according to claim 15, wherein said stripping housing comprises first and second opposing major surfaces, first and second opposing sidewalls, and said first and second surfaces in which said first and second openings are formed, respectively.

23. The tool according to claim 22, further comprising first and second tapped openings formed in said first and second major surfaces, respectively.

24. The tool according to claim 23, wherein said stripping housing is rotatably interconnected to said main housing by first and second screws extending through said main housing and into said first and second tapped openings, respectively, and said stripping housing being rotatable about a second longitudinal axis that extends through said first and second screws.

25. The tool according to claim 24, wherein said main handle extends along a third longitudinal axis that is transverse to said second longitudinal axis.

26. A tool for terminating a co-axial cable extending along a first longitudinal axis, and having an inner conductor, an outer conductor, a dielectric material disposed between the inner and outer conductors, and a protective material disposed in covering relation to the outer conductor said tool comprising:
  a. a handle;
  b. a main housing interconnected to said handle;
  c. a stripping housing engaged with said main housing for movement relative thereto between first and second cutting position; and
  d. a rotational motion transfer assembly, comprising:
    i. an elongated shaft interconnecting said main handle to said main housing, and
    ii. a locking mechanism for transferring rotational motion from said main handle to said main housing.

27. The tool according to claim 26, wherein said locking mechanism comprises a disc positioned on said elongated shaft, and first and second pins securely engaged with said disc and removably engaged with said main housing.

28. A tool for terminating a co-axial cable extending along a first longitudinal axis, and having an inner conductor, an outer conductor, a dielectric material disposed between the inner and outer conductors, and a protective material disposed in covering relation to the outer conductor, said tool comprising:
  a. a handle;
  b. a main housing interconnected to said handle;
  c. a stripping housing engaged with said main housing for movement relative thereto between first and second cutting positions; and
  d. said stripping housing comprises first and second opposing major surfaces, first and second opposing sidewalls, and first and second surfaces in which first and second openings are formed, respectively.

29. The tool according to claim 28, further comprising first and second tapped openings formed in said first and second major surfaces, respectively.

30. The tool according to claim 29, wherein said stripping housing is rotatably interconnected to said main housing by first and second screws extending through said main housing and into said first and second tapped openings, respectively, and said stripping housing is rotatable about a second longitudinal axis that extends through said first and second screws.

31. The tool according to claim 30, wherein said main housing extends along a third longitudinal axis that is transverse to said second longitudinal axis.

* * * * *